United States Patent [19]

Koseki et al.

[11] Patent Number: 4,934,430
[45] Date of Patent: Jun. 19, 1990

[54] PNEUMATIC RADIAL TIRE

[75] Inventors: Hiroyuki Koseki; Yasuhiko Kobayashi; Takashi Kukimoto, all of Tokyo, Japan

[73] Assignee: Bridgestone Corporation, Tokyo, Japan

[21] Appl. No.: 265,967

[22] Filed: Nov. 2, 1988

[30] Foreign Application Priority Data

Nov. 6, 1987 [JP] Japan ................................ 62-280812
Nov. 6, 1987 [JP] Japan ................................ 62-280813

[51] Int. Cl.$^5$ .......................... B60C 9/28; B60C 11/06
[52] U.S. Cl. ................................ 152/538; 152/209 D; 152/531
[58] Field of Search ................... 152/531, 538, 209 D, 152/209 R, 535, 536

[56] References Cited

U.S. PATENT DOCUMENTS

| | | | |
|---|---|---|---|
| 2,884,040 | 4/1959 | Boussu et al. | 152/531 X |
| 3,677,319 | 7/1972 | Mirtain | 152/531 X |
| 4,269,646 | 5/1981 | Miller et al. | 152/531 X |
| 4,274,464 | 6/1981 | Pommier | 152/535 X |

FOREIGN PATENT DOCUMENTS 60-45404  3/1985  Japan ............................... 152/209 D
62-251206 11/1987  Japan ............................... 152/209 D Primary Examiner—Raymond Hoch
Attorney, Agent, or Firm—Sughrue, Mion, Zinn, Macpeak & Seas

[57] ABSTRACT

A pneumatic radial tire includes a carcass layer consisting of at least one carcass ply having cords embedded therein and extending substantially in radial directions, a tread arranged radially outwardly of the carcass layer, and a belt layer consisting of at least tow layers of belt plies having cords embedded therein intersecting with each other at angles within 10°–40°. The tire comprises a reinforcing layer arranged between the carcass layer and the belt ply arranged radially outermost and consisting of at most two layers of reinforcing plies having cords embedded therein substantially in parallel with an equatorial plane. Both outer ends of the reinforcing layer are positioned inwardly, in width directions, of locations spaced apart one fifth of a tread width of the tire from shoulder ends. Outer ends of at least one reinforcing ply are positioned inwardly, in the width directions, of outermost ends of main grooves in the tread between center ribs and side ribs. The side ribs are formed with a plurality of traverse grooves spaced apart from each other in circumferential directions and having both ends opening into the main grooves.

5 Claims, 12 Drawing Sheets

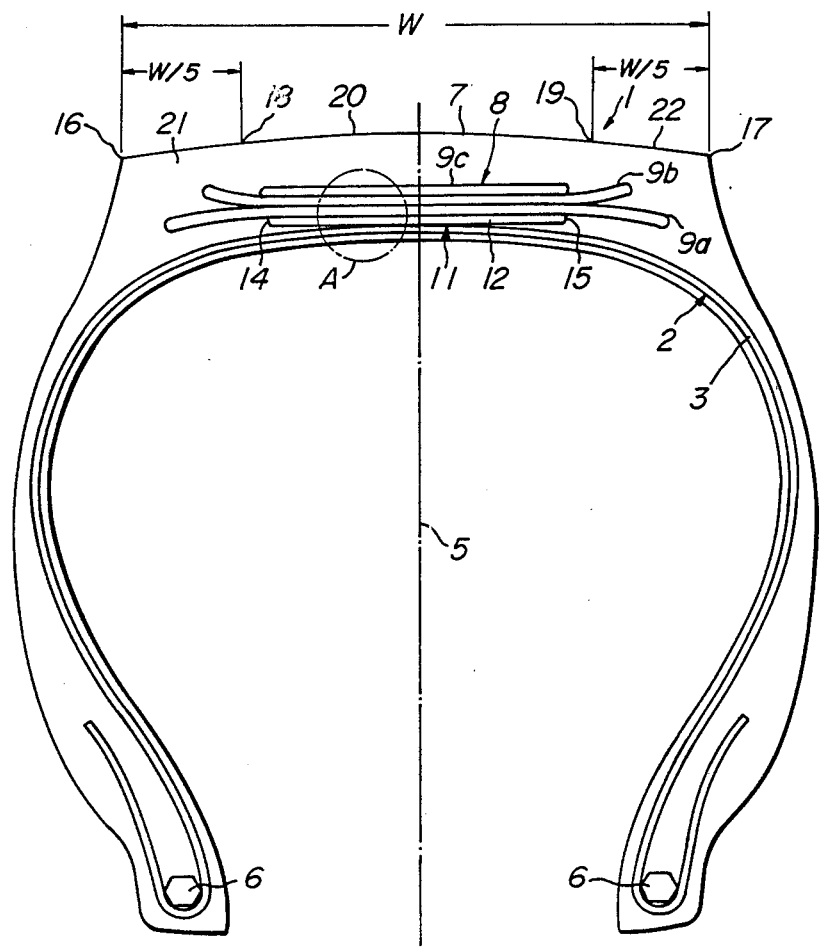
FIG_1

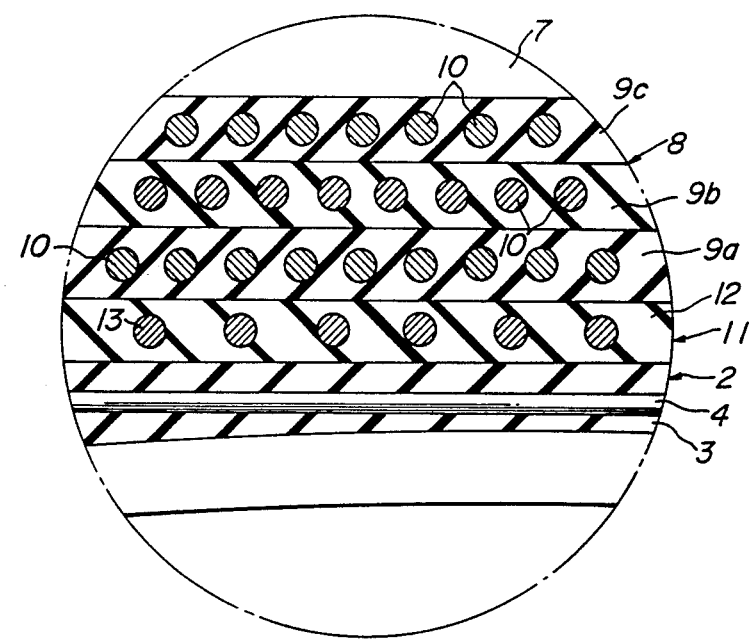
FIG_2

FIG_3a
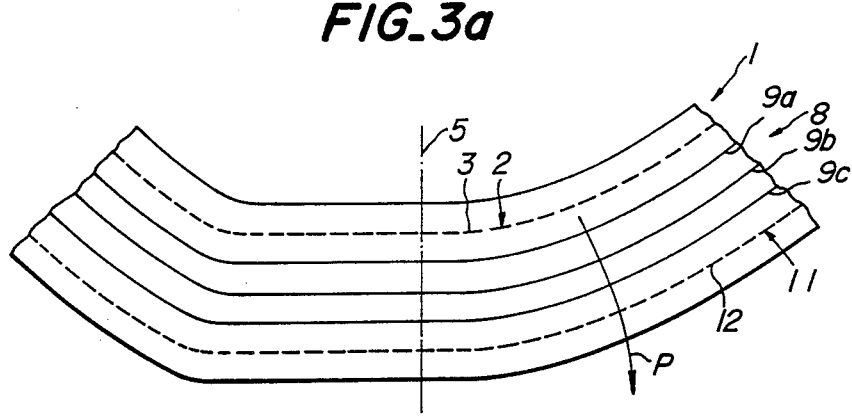
FIG_3b
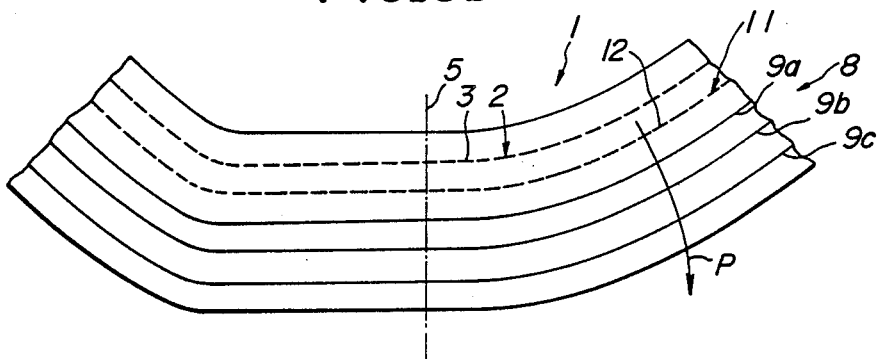

FIG_4a
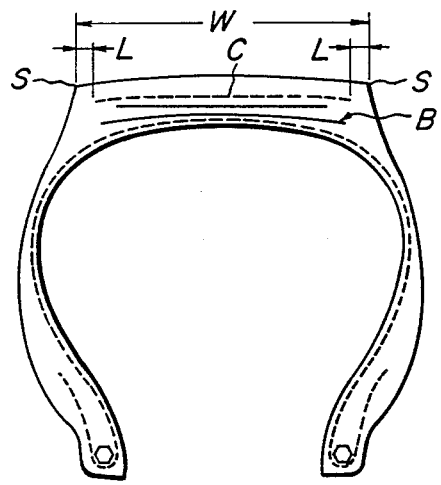
FIG_4b
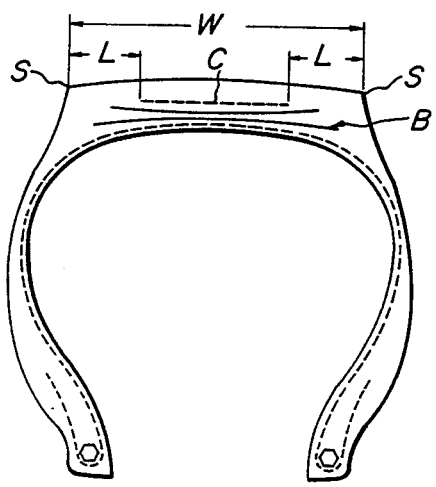

FIG_4c
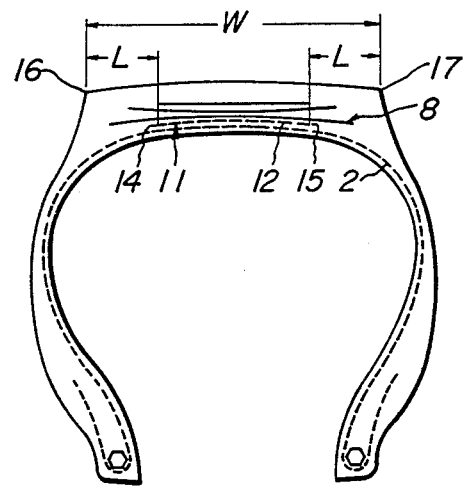
FIG_4d
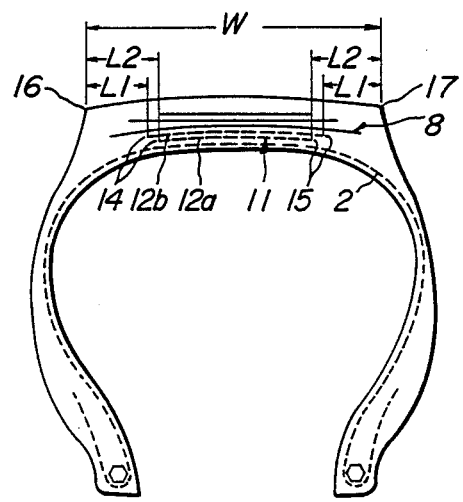

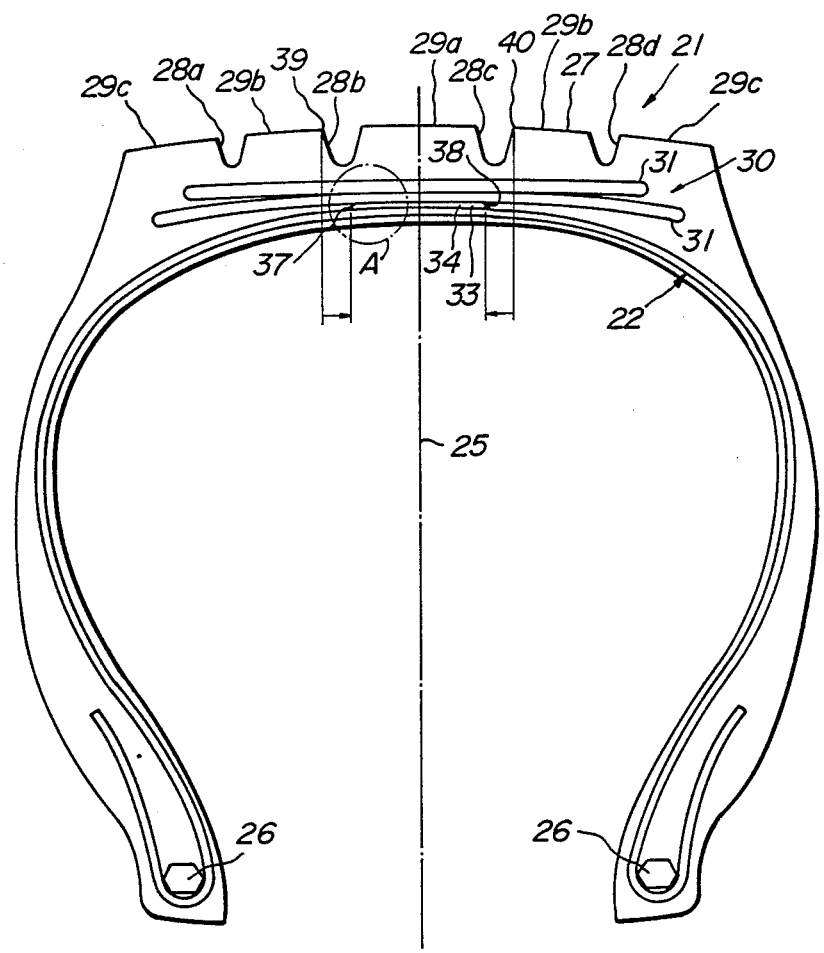
FIG_5

FIG_6
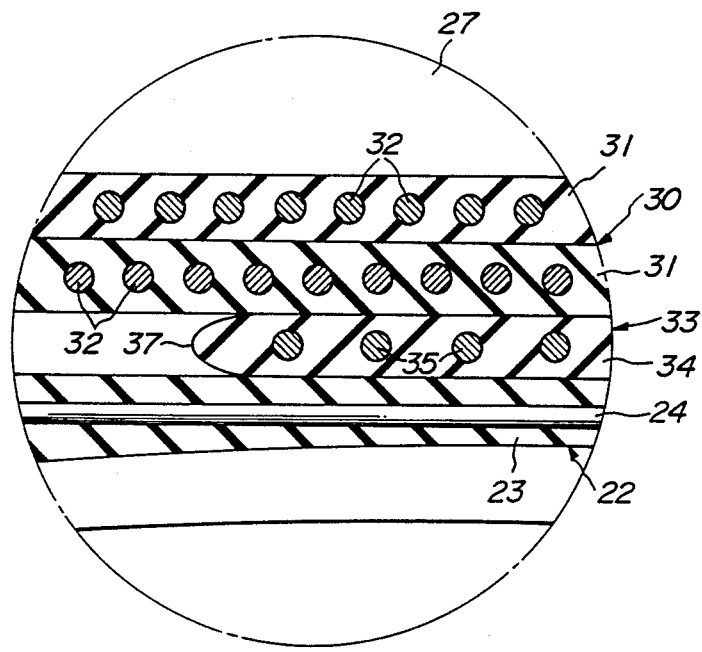

FIG_7
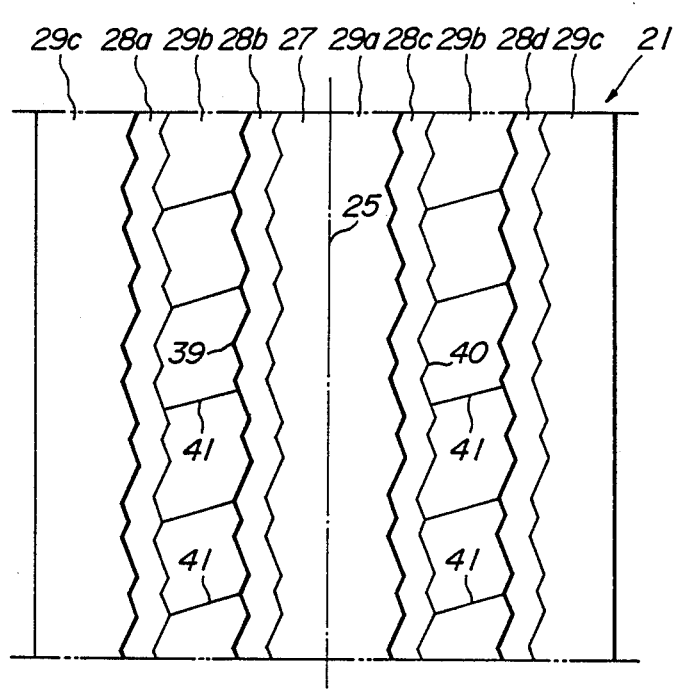

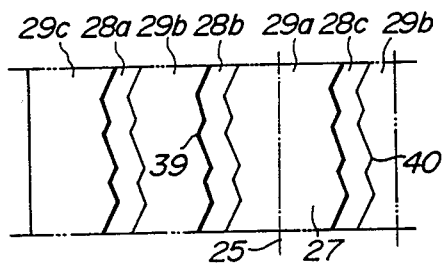
FIG_8a
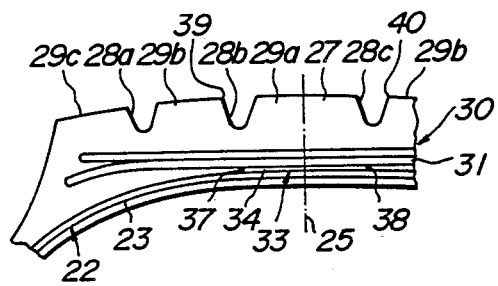
FIG_8b
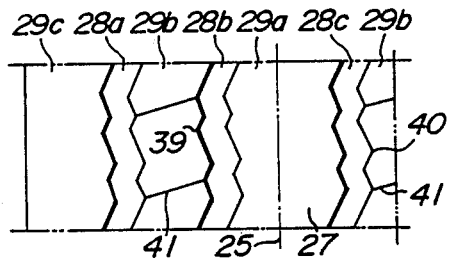
FIG_8c
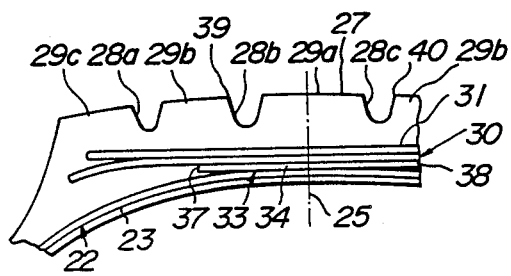
FIG_8d

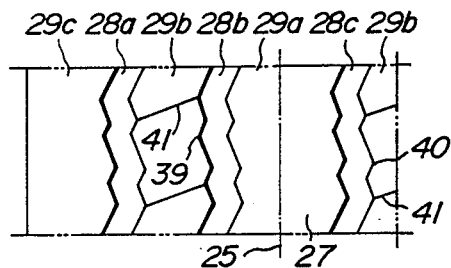
FIG_8e
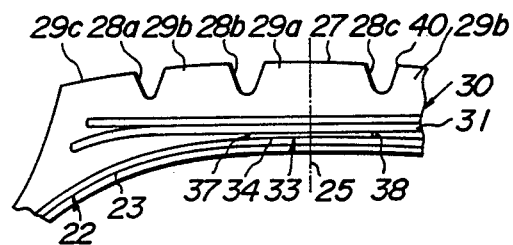
FIG_8f
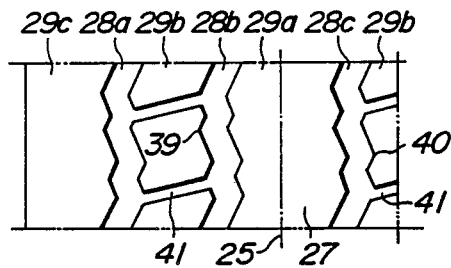
FIG_8g
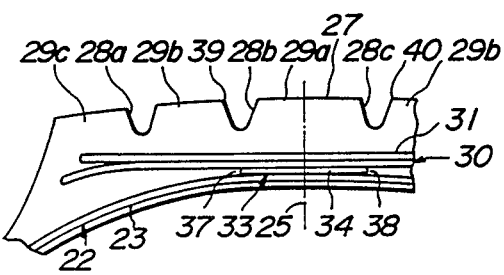
FIG_8h

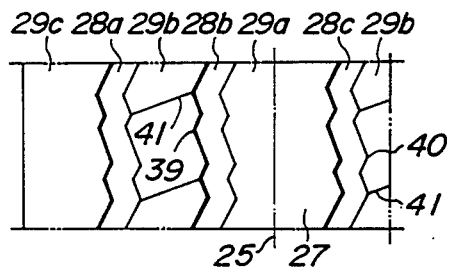
FIG_8 i
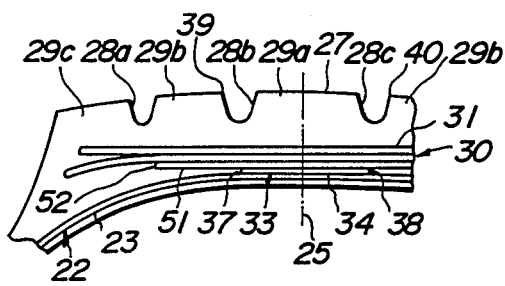
FIG_8 j
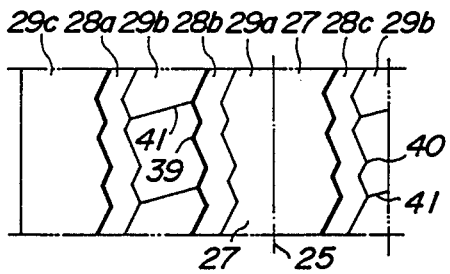
FIG_8 k
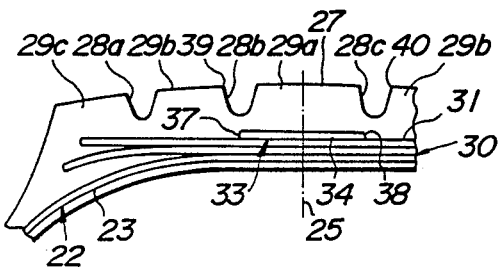
FIG_8 l

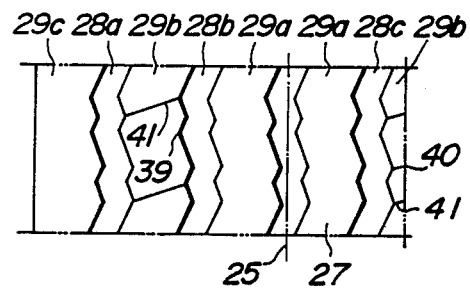
FIG_8m
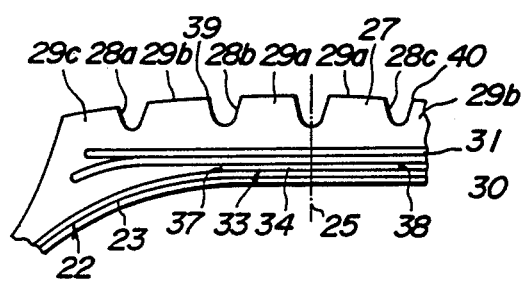
FIG_8n
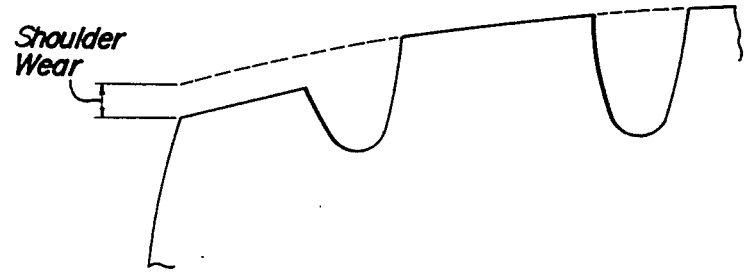
FIG_9

PNEUMATIC RADIAL TIRE

BACKGROUND OF THE INVENTION

This invention relates to a pneumatic radial tire.

In general, with a pneumatic radial tire, belt end separations (separations of plies at belt ends) often occur when large shearing forces act between plies at belt ends due to enlarging diameter when filling with inner pressure and deformation in contact road and rolling under loaded condition.

In order to prevent such a separation, it has been proposed to arrange a cap having a strong hoop effect radially outwardly of a belt layer to cover the entire width of the belt layer. Such a cap has cords embedded therein and extending substantially in parallel with an equatorial plane of the tire.

With such a pneumatic tire, however, as the cap covers the overall width of the belt layer, the belt layer is difficult to deform not only at a center portion of the width but also at both ends thereof in width directions. In this case, a crown portion of the pneumatic tire is generally convex as a whole so that a diameter at the center portion is larger than that at shoulder portions. Therefore, when the pneumatic radial tire is deformed in rolling and contacting a road under a loaded condition, the belt layer resists deformation so that it becomes difficult to absorb the difference in diameter between the center portion and the shoulder portions of the tread, with the result that contacting pressure at the shoulder portions with the road is lowered. As a result, the shoulder portions are likely to be dragged so that the shoulder portions are slid in the contacting area on the road. Accordingly, irregular wear such as shoulder wear would occur in the shoulder portions.

Inventors of this application have been investigated tires of this kind and proposed to narrow the width of the cap having cords embedded therein substantially in parallel with an equatorial plane to make easy the deformation of the both ends of the belt layer in width directions, thereby facilitating absorbing the difference in diameter between shoulder portions and the center portion when deforming in contacting the road. With this arrangement, however, although the shoulder wear above described can be prevented, the hoop effect at both ends of the belt layer is eliminated so that the shearing force between plies at ends of the belt plies is increased to a certain degree resulting in failure or trouble.

Moreover, although the irregular wear such as shoulder wear can be prevented, tread portions (ribs) in regions overlapping the reinforcing ply are sometimes conspicuously rapidly worn. Such a wear is referred to as "rib punch". This phenomenon results from the fact that if one circumferential length of the reinforcing ply is slightly long to have slacks, the reinforcing plies and the ribs in the region overlapping the reinforcing plies are waved, with the result that recesses of the ribs corresponding to bottoms of the waves are dragged, when contacting the road, to slip on the road resulting in rapid wear.

SUMMARY OF THE INVENTION

The inventors have further investigated and studied this matter to find that as the reinforcing plies are difficult to change the length in deforming when contacting a road, circumferential compressive forces act on belt plies, if the belt plies are arranged radially outwardly of the reinforcing plies, and therefore to find that it is preferable to arrange the reinforcing plies radially inwardly of the outermost belt plies.

Moreover, the inventors have found that by forming traverse grooves arranged in tread portions in regions overlapping the reinforcing plies and having ends opening into main grooves, reduction in diameter of the tread at outer sides in contacting a road is possible, whereby the diameter of the tread at outer ends approximate to diameters at the recesses above described to make uniform the contacting pressure in a wide area, thereby preventing the rib punch.

In U.S. Pat. No. 4,271,891, limiting blocks have been disclosed which are arranged between a belt ply and a carcass and whose cord angles are less than cord angles of the belt ply. Each limiting block consists of two layers whose cords are inclined relative to an equatorial plane of the tire and intersecting with each other. Such limiting blocks serve only to reduce shearing forces at ends of the belt ply but separations are apt to occur in ends of the limiting blocks due to the shearing forces. The inventors of this application have found that the shearing forces in the reinforcing ply can be prevented by arranging the cords of reinforcing ply in parallel with an equatorial plane of the tire.

It is an object of the invention to provide an improved pneumatic radial tire which eliminates all the disadvantages of the prior art and can prevent the belt end separation and the irregular wear.

In order to achieve this object, the pneumatic radial tire including a carcass layer consisting of at least one carcass ply having cords embedded therein and extending substantially in radial directions, a tread arranged radially outwardly of the carcass layer, and a belt layer consisting of at least two layers of belt plies having cords embedded therein intersecting with each other at angles within 10°–40°, according to the invention the tire comprises a reinforcing layer arranged between said carcass layer and the belt ply arranged radially outermost and consisting of at most two layers of reinforcing plies having cords embedded therein substantially in parallel with an equatorial plane, and both outer ends of the reinforcing layer are positioned inwardly, in width directions, of locations spaced apart one fifth of a tread width of the tire from shoulder ends.

In another aspect of the invention, a pneumatic radial tire including a carcass layer consisting of at least one carcass ply having cords embedded therein and extending substantially in radial directions, a tread arranged radially outwardly of the carcass layer, a belt layer consisting of at least two layers of belt plies having cords embedded therein intersecting with each other at angles within 10°–40°, and a reinforcing layer arranged between said carcass layer and said tread and consisting of at most two layers of reinforcing plies having cords embedded therein intersecting at angles of 0°–10° with respect to an equatorial plane, and said tread being formed in an outer circumference with either of four and five main annular grooves substantially in parallel with the equatorial plane to form center ribs at a center portion of the tread in width directions and a pair of side ribs on both sides of the center ribs, according to the invention outer ends of at least one reinforcing ply are positioned inwardly, in the width directions, of outermost ends of the main grooves between the center ribs and the side ribs, and the side ribs are formed with a plurality of traverse grooves spaced apart from each other in circumferential directions and having both ends opening into the main grooves.

In this invention, the reinforcing layer is limited to position its outer ends inwardly of location spaced from one fifth of a tread width from shoulder ends. As a result, the shearing forces between plies at belt ends caused by deformations in contacting a road in rolling under a loaded condition are restrained to small values in comparison with the case free from the reinforcing layer. Moreover, as the positions in the width direction are limited as above described, the shoulder portions easily follow a surface of a road so as to deform. As a result, the difference in diameter between the shoulder portions and the center portion is easily absorbed to prevent irregular wear. Moreover, as the reinforcing layer is arranged between the carcass layer and the belt ply arranged radially outermost, the shearing force between the plies at belt ends in rolling under the loaded condition is further reduced to prevent the belt end separation in a reliable manner in conjunction with the shearing force restraining effect as above described.

Even if center ribs overlapping the reinforcing ply in contacting surface under a loaded condition are waved, the contacting pressure becomes uniform and the rapid wear of the recesses or the rib punch can be prevented by forming the traverse grooves in the side ribs which are not restrained by the reinforcing ply to make the side ribs follow to the recesses of the center ribs.

In order that the invention may be more clearly understood, preferred embodiments will be described, by way of example, with reference to the accompanying drawings.

BRIEF DESCRIPTION OF THE DRAWINGS

FIG. 1 is a sectional view of one embodiment of the tire according to the invention taken along a radial plane passing through a rotating axis of the tire;

FIG. 2 is an enlarged view of the portion A in FIG. 1;

FIGS. 3a and 3b are circumferential sectional views of tires for explaining the affection of the reinforcing layer on the belt layer;

FIGS. 4a, 4b, 4c and 4d are radial sectional views of tires used in the first test;

FIG. 5 is a radial sectional view of another embodiment of the tire according to the invention;

FIG. 6 is an enlarged view of the portion A in FIG. 5;

FIG. 7 is a development view of the tread of the tire shown in FIG. 6;

FIGS. 8a-8n are development views of tread and radial sectional views of tires used in the fourth test; and FIG. 9 is a radial sectional view of a tire for explaining shoulder wear.

DESCRIPTION OF THE PREFERRED EMBODIMENTS

Referring to FIGS. 1 and 2, a pneumatic tire 1 according to the invention includes toroidal carcass layer 2 consisting of a carcass ply 3 of at least one layer (one layer carcass ply 3 in this embodiment). Each carcass ply 3 comprises a number of reinforcing cords 4 made of steel embedded therein. These cords 4 extend in substantially radial directions or directions substantially perpendicular to an equatorial plane 5 of the tire. Both side edges of the carcass layer 2 are folded or doubled about annular beads 6.

An annular tread 7 is arranged radially outward of the carcass layer 2. Between the tread 7 and the carcass layer 2 is arranged an annular belt layer 8 consisting of at least two layer belt plies, in this embodiment three layer belt plies or first, second and third belt plies 9a, 9b and 9c. A number of reinforcing cords 10 are embedded in each of the three layer belt plies. Inclinations of these cords 10 extend in reverse directions for the belt plies with respect to the equatorial plane 5. In other words, the cords 10 of the respective belt plies intersect with each other on both sides of the equatorial plane 5.

Moreover, angles of the intersecting of these cords 10 with respect to the equatorial plane 5 are within a range of 10°-40°. A reinforcing layer 11 consists of at the most two layers of reinforcing plies 12. In the reinforcing plies 12 are embedded a number of cords 13 which are substantially in parallel with the equatorial plane 5. A single cord 13 may be arranged spirally. As a result, the reinforcing layer 11 has a strong hoop effect.

The reason why the reinforcing layer 11 consists of at the most two layers of the reinforcing plies 12 is as follows. If the reinforcing layer 11 consists of more than thee layers of the plies 12, thicknesses of the radial layer including the tread 7, the belt layer 8 and the reinforcing layer 11 are too thick which detrimentally affect the heating of the tire. Moreover, both outer ends 14 and 15 of each reinforcing ply 12 of the reinforcing layer 11 must be positioned inwardly in width directions of points 18 and 19 which are spaced one fifth of the tread width W from both shoulder ends 16 and 17, respectively. If both the outer ends 14 and 15 are positioned outwardly in the width direction of the points 18 and 19, both side edges of the belt layer 8 are restrained by the reinforcing layer 11 and therefore are difficult to deform. As a result, when the tread is deformed even in contact with a road in rolling under a loaded condition, it becomes difficult to absorb the difference in radius between the center portion 20 and shoulder portions 21 and 22 so that irregular wear such as shoulder wear would occur at the shoulder portions 21 and 22.

In this case, the "shoulder ends 16 and 17" means ends contacting the road when the tire is filled with the normal inner pressure and loaded with the normal load, and the "tread width" means a distance between the above ends in a radial section including a rotating axis of the tire in the same condition. As there is provided the reinforcing layer 11 having the strong hoop effect as above described, shearing stresses are restrained which are caused between the belt plies 9 at the ends of the belt layer 8 when being filled with the inner pressure and deformed upon contacting with the road. The wider the width of the reinforcing layer 11, the larger is the shearing stress restraining effect. However, the width of the reinforcing layer 11 has a limitation as above described.

Moreover, it is preferable to position outer ends 14 and 15, in width directions, of at least one reinforcing ply 12 of the reinforcing layer 11 outwardly of points in the width directions spaced from the equatorial plane one tenth of the tread width W. If the outer ends 14 and 15 are inwardly in the width directions, the shearing stresses between the belt plies cannot be reduced as in the manner above described.

Moreover, the reinforcing layer 11 is arranged between the carcass layer 2 and the belt ply arranged radially innermost, in this embodiment the third belt ply 9a. Circumferential displacements of the belt plies of the belt layer 8 on the equatorial plane 5 will be now considered referring to FIGS. 3a and 3b. These drawings illustrate circumferential sections cut the region including the reinforcing layer 11 of the tire 1 in parallel with the equatorial plane 5. The left half of each drawing shows a condition deformed in contacting the road and rolling under a load, and right half shows a free condition.

In case that the reinforcing layer 11 is arranged radially outwardly of the belt layer 8 as shown in FIG. 3a, one circumferential length of the belt layer 8 is shorter than that of the reinforcing layer 11 and the circumferential length of the reinforcing layer 11 is difficult to change by deformation caused by contacting the road. Therefore, when the belt layer 8 and the reinforcing layer 11 are subjected to a circumferential bending force P as shown by an arrow in FIG. 3a in contacting the road to deform flat, the belt layer 8 is elongated by the reinforcing layer 11.

On the other hand, in the case shown in FIG. 3b, the reinforcing layer 11 is arranged inwardly of the radially outermost belt ply 9c of the belt layer 8, or between the belt layer 8 and the carcass layer 2. In this case, when the belt layer 8 and the reinforcing layer 11 are subjected to a circumferential bending force P in contacting the road to deform flat, the belt plies outwardly of the reinforcing layer 11 are compressed by the reinforcing layer 11 in an opposite manner to that as above described.

In this manner, as the reinforcing layer 11 is arranged between the carcass layer 2 and the radially outermost belt ply 9c of the belt layer 8, the compression force affects the side ends, in the width directions, of the radially outermost belt ply 9c with the aid of the reinforcing layer 11 so that the shearing forces at belt ends are further restrained. Such an effect is increased, as the reinforcing layer 11 is positioned further radially inwardly. Therefore, it is preferable to position the reinforcing layer 11 between the carcass layer 2 and all the belt plies or the belt layer 8.

Moreover, it is preferable that the sum of moduli of elasticity of the reinforcing plies 12 per unit width in directions of the cords is within 10-35% of the sum of moduli of elasticity of the belt plies per unit width in directions of the cords. If it is less than 10%, the effect for restraining enlargement of diameter of the plies cannot be expected. Thus the effect for reducing the shearing force between the plies at ends of the belt in rolling under being loaded is small so that improvement of end separation-resistance cannot be expected. On the other hand, if the value is more than 35%, ratio of the tensile force supported by the reinforcing layer 11 to that supported by the belt layer 8 is increased, and more particularly the followability to protrusions or the like on a road is lowered so that there is a risk of the cords of the reinforcing plies 12 being damaged. A material of the cords 13 of the reinforcing plies 12 may be aramid fibers, steel having an extensible property or the like.

Various tests on tires according to the invention and prior art were carried out. The first test will be explained. In starting the first test, Comparative tires 1, Comparative tires 2, Example tires 1 and Example tires 2 whose size is 10.00 R 20 were prepared. With the Comparative tires 1, a cap c is arranged radially outwardly of a belt layer B so that a distance L from shoulder ends S to outer ends, in width directions, of the cap C is 5% of a tread width W as shown in FIG. 4a. With the comparative tires 2, a cap is arranged radially outwardly of a belt layer B so that a distance L from shoulder ends S to outer ends of the cap C is 24% of a tread width W as shown in FIG. 4b.

On the other hand, in the Example tires 1, a reinforcing layer 11 consisting of one reinforcing ply 12 is arranged between a belt layer 8 and a carcass layer 2 so that a distance L from shoulder ends 16 and 17 to outer ends 14 and 15, in width directions, of the reinforcing layer 11 is 24% of a tread width as shown in FIG. 4c. Further, with the Example tires 2, a reinforcing layer 11 consisting of two reinforcing plies 12a and 12b is arranged between a belt layer 8 and a carcass layer 2 so that a distance L from shoulder ends 16 and 17 to outer ends 14 and 15, in width directions, of the reinforcing plies 12a and 12b is 24% and 35% of a thread width as shown in FIG. 4d.

TABLE 1

| | Comparative tire 1 | | Comparative tire 2 | | Example tire 1 | | Example tire 2 | |
|---|---|---|---|---|---|---|---|---|
| | Tensile modulus of elasticity (kg/cm) | Cord angle (degree) Width (mm) | Tensile modulus of elasticity (kg/cm) | Cord angle (degree) Width (mm) | Tensile modulus of elasticity (kg/cm) | Cord angle (degree) Width (mm) | Tensile modulus of elasticity (kg/cm) | Cord angle (degree) Width (mm) |
| First belt ply | $6.4 \times 10^4$ | right 20 155 | $6.4 \times 10^4$ | right 20 155 | $6.4 \times 10^4$ | right 20 155 | $6.4 \times 10^4$ | right 20 155 |
| Second belt ply | $6.4 \times 10^4$ | left 20 170 | $6.4 \times 10^4$ | left 20 170 | $6.4 \times 10^4$ | left 20 170 | $6.4 \times 10^4$ | left 20 170 |
| Third belt ply | | | | | $4.6 \times 10^4$ | left 20 80 | $4.6 \times 10^4$ | left 20 80 |
| First reinforcing ply | $2.4 \times 10^4$ (cap) | 0 163 | $2.4 \times 10^4$ (cap) | 0 95 | $2.4 \times 10^4$ | 0 95 | $1.8 \times 10^4$ | 0 95 |
| Second reinforcing ply | | | | | | | $1.8 \times 10^4$ | 0 72 |

Tensile modulus of elasticity: obtained by multiplying sectional area of cords by Young's Modulus and further by number of cords per unit width.

TABLE 2

| | Comparative tire 1 | | Comparative tire 2 | | Example tire 1 | | Example tire 2 | |
|---|---|---|---|---|---|---|---|---|
| | Kind of cord | Number of cords per unit width of ply (number/cm) | Kind of cord | Number of cords per unit width of ply (number/cm) | Kind of cord | Number of cords per unit width of ply (number/cm) | Kind of cord | Number of cords per unit width of ply (number/cm) |
| First belt ply | 3 × 0.20 + 6 × 0.38 | 5.5 | 3 × 0.20 + 6 × 0.38 | 5.5 | 3 × 0.20 + 6 × 0.38 | 5.5 | 3 × 0.20 + 6 × 0.38 | 5.5 |

TABLE 2-continued

| | Comparative tire 1 | | Comparative tire 2 | | Example tire 1 | | Example tire 2 | |
|---|---|---|---|---|---|---|---|---|
| | Kind of cord | Number of cords per unit width of ply (number/cm) | Kind of cord | Number of cords per unit width of ply (number/cm) | Kind of cord | Number of cords per unit width of ply (number/cm) | Kind of cord | Number of cords per unit width of ply (number/cm) |
| Second belt ply | 3 × 0.20 + 6 × 0.38 | " | 3 × 0.20 + 6 × 0.38 | " | 3 × 0.20 + 6 × 0.38 | " | 3 × 0.20 + 6 × 0.38 | " |
| Third belt ply | | | | | 3 × 0.20 + 6 × 0.38 | 4.0 | 3 × 0.20 + 6 × 0.38 | 4.0 |
| First reinforcing ply | 4 × 4 × 0.23 | 4.8 | 4 × 4 × 0.23 | 4.8 | 4 × 4 × 0.23 | 4.8 | 4 × 4 × 0.23 | 3.6 |
| Second reinforcing ply | | | | | | | " | " |

Dimensions of the respective tires are shown in Tables 1 and 2. These tires were equipped on a front axle of a flat body truck of type 2.D-4 (having one front axle and two rear axles, one front axle of which is a driven axle and each rear axle equipped with four tires). Thereafter, these tires were filled with inner pressure of 8.0 kg/cm², and the truck equipped with the tires were driven 80,000 Km on paved highways and general paved roads with a ratio of 70% and 30%, respectively, under 100% loaded condition. After traveling, the tires were cut and lengths of cracks at belt ends were measured.

Assuming that the length of cracks in the Comparative tires 1 was index 100, the length of cracks of the Comparative tires 2 was 84, and those of the Examples tires 1 and 2 were 84 and 74, respectively by the index indication. From the results, it was clear that the length of cracks at belt ends could be sufficiently reduced according to the invention. Moreover, it was found from the test that the mere limitation of the position of the outer ends of the caps as reinforcing layers rather lowers the belt end separation-resistance. However, the separation-resistance is remarkably improved to an extent sufficient to compensate for the lowering of the resistance by arranging the reinforcing layer 11 between the belt layer 8 and the carcass layer 2 in addition to the above limitation, and the reinforcing plies of two layers more serve to improve the belt end separation-resistance.

In this case, the length of cracks in the Comparative tires 1 was in fact 5.0 mm. Moreover, amounts of shoulder wear after traveling were measured at positions shown in FIG. 9. As the results, when the amount of shoulder wear was indicated by index 100, that of the Comparative tires 2 was 20, and those of the Example tires 3 and 4 were 19 and 22, respectively, by the index indication. From this, it was clear that the shoulder wear was sufficiently reduced according to the invention. Moreover, it was found that both the reinforcing plies of one and two layers exhibit substantially similar irregular wear-resistance. In this case, the shoulder wear of the Comparative tires was in fact 6.4 mm.

The second test will now be explained. In this test, Comparative tires 3 whose distance L was 0.15 W and Example tires 1 whose distance L was 0.24 W were prepared and the trucks were driven under the same condition as in the first test. Dimensions of the Comparative tires were the same as those of the Comparative tires 1. After traveling, the shoulder wear was measured in the same manner as in the first test. With the shoulder wear of the Comparative tires 3 being index 100, that of the Example 1 was 34 by the index indication. The index 100 corresponds to 3.5 mm. As was clear from this, the irregular wear was sufficiently reduced in case of the distance L being more than W/5.

The third test will be then explained. In the test, Comparative tires 4 and Example tires 1 were prepared having values of 0.07 and 0.14, respectively, which values were obtained by dividing the sum of moduli of elasticity per unit width of reinforcing plies in cord directions by sum of moduli of elasticity per unit width of belt plies in cord directions. The trucks equipped with these tires were driven under the same condition as in the first test. Other dimensions of the Comparative tires 4 were similar to those of the Example tires 1. After traveling, lengths of cracks at belt ends were measured in the same manner as above described. In this case of that lengths of cracks of the Comparative tires 4 were indicated by index 100, those of the Example tires 1 were 78 by the index indication. The index 100 corresponds to 5.4 mm. As is clear from this, with the divided value being more than 0.10, the belt end separation was prevented with great certainty.

Referring to FIGS. 5, 6 and 7 illustrating another aspect of the invention, a tread 27 is formed in its outer surface with four or five (four in this embodiment) annular main grooves 28a, 28b, 28c and 28d spaced apart from each other and in substantially parallel with an equatorial plane 25. As a result, the outer circumference of the thread 27 is divided into a center rib 29a at a mid portion of the thread width, a pair of side ribs 29b adjacent on both sides of the main groove 29a, and a pair of end ribs 29c further outwardly of the side grooves. In case of five main grooves 28a, the center main groove is along the equatorial plane 25 and the center rib is two ribs.

Between the tread 27 and a carcass layer 22 is arranged an annular belt layer 30 consisting of at least two (two in this embodiment) belt plies 31. A number of reinforcing cords 32 made of steel or the like are embedded in these belt plies 31. The cords are inclined with respect to the equatorial plane 25 in reverse directions for every belt plies 31. In other words, these cords 32 are intersected at the equatorial plane 25. Intersection angles of the cords 32 with the equatorial plane 25 are within 10°–40°. A reinforcing layer 33 consists of at the most two layers of reinforcing plies 34 and is arranged between the carcass layer 22 and the tread 27, in this embodiment between the carcass layer 22 and the belt layer 30. However, the reinforcing layer 33 may be arranged between the tread 27 and the belt layer 30 or between the belt plies 31.

In the reinforcing plies 14 are embedded cords 35 spirally or in parallel with each other, whose intersection angles with respect to the tire equatorial plane 25 are less than the intersection angles of cords 32 of the belt plies 31 or less than 10°. The reinforcing layer 33 consists of the reinforcing plies 34 of at the most two layers. If the reinforcing plies 34 are three or more layers, the thickness of the tread 27, the belt layer 30 and the reinforcing layer 33 in radial directions is too thick so that it detrimentally affect the heating of the tire. As the cords 35 having the angles above described are embedded in the reinforcing plies 34 in the above manner to provide the strong hoop effect, shearing forces between the plies at the belt ends when filled with the inner pressure are reduced so that the belt end separation can be prevented.

The reinforcing plies 34 having the cords arranged within the above angles and embedded therein could not be in fact extensible and contractible. Therefore, even if the one circumferential length of the reinforcing plies 34 is not correct or slack, a surface of the tread 27 on the slacked reinforcing plies 34 is waved. If the surface of the tread is waved, bottoms of the waves are dragged when contacting a road and slid on the road so that wear rapidly progresses. For this reason, both outer ends 37 and 38, in width directions, of at least one reinforcing ply 34 are positioned inwardly, in the width directions, of the outermost ends 39 and 40 of the main grooves 28b and 28c between the center rib 29a and the side rib 29b, and each of the side ribs 29b is formed with a plurality of traverse grooves 41 spaced apart in circumferential directions and having ends opening into the main grooves 28a, 28b, 28c and 28d. As a result, each side rib 9b is divided by the traverse grooves 41 into blocks so that each side rib 9b easily deforms when contacting the road to reduce the diameter, with the result that its radii become near to the radii of the bottoms of the waves. Therefore, the contacting pressure of the tire with the road becomes uniform over the wide area so that rapid wear at the bottoms of the waves is restrained to prevent the rib punch.

The reason why the outermost ends 37 and 38 of at least one reinforcing ply 34 are located inwardly of the outermost ends 39 and 40 of the main grooves 28b and 28c between the center rib 29a and the side rib 29b is as follows. If the outermost ends 37 and 38 of the reinforcing ply 34 of a single layer or two layers arranged outwardly of the outermost ends 39 and 40 of the main grooves 28b and 28c, the hoop effect of the reinforcing ply 34 acts also on the side ribs 9b to improve their rigidity. As a result, the reduction in diameter when contacting the road becomes difficult to achieve, while the rigidity of the side ribs 29b is not uniform in width directions, irregular wear (river wear) occurs only at edges of the side ribs 9b. As such an irregular wear looks like a river eroding a basin about it when rising, it is referred to as "river wear".

In the event that the main grooves 28b and 28c are zigzag, the outermost ends 39 and 40 of the main grooves 28b and 28c in the width directions mean bottoms, furthest from the equatorial plane 25, of outer zigzag walls of the main grooves 28b and 28c. If the main grooves 28b and 28c are straight, the outermost ends 39 and 40 mean the outer walls of the main grooves. The traverse grooves 41 are sipes which open into the main grooves and are closed when contacting the road. The traverse grooves 41 may be wide main grooves which are not closed when contacting the road. The traverse grooves 41 may be straight, zigzag or curved.

A comparative test as a fourth test was effected. In the test, Comparative tires A and B and Example tires a, b, c, d and e were prepared. In the Comparative tire A, as shown in FIGS. 8a and 8b, outer ends 37 and 38 of a reinforcing ply 34 are located inwardly of the outermost ends 39 and 40 of the main grooves 28b and 28c, but side ribs 29b do not include traverse grooves. In the Comparative tire b, as shown in FIGS. 8c and 8d, although side ribs 29b are formed with traverse grooves 41, outer ends 37 and 38 are arranged outwardly, in width directions, of the outermost ends 39 and 40 of main grooves 28b and 28c. The Example tire a has the traverse grooves 41 in the form of sipes as above described as shown in FIGS. 8e and 8f. The Example tire b is the tire according to the invention having the traverse grooves 41 of wide main grooves as shown in FIGS. 8g and 8h. The Example tire c is the tire similar to the Example tire a, which comprises, between a reinforcing ply 14 and a belt layer 10, a wide reinforcing ply 51 whose outer ends 52 are positioned outwardly, in width directions, of the outermost ends 39 and 40 of main grooves 28b and 28c as shown in FIGS. 8i and 8j. The Example tire d is the tire above described in which the reinforcing ply 34 is replaced from between the belt layer 30 and the carcass layer 32 to between the belt layer 30 and the tread 27 as shown in FIGS. 8k and 8l. The Example tire e is the tire having five main grooves 28 and reinforcing ply 34 arranged radially inwardly of two center ribs 29a located at the mid portion as shown in FIGS. 8m and 8n.

These tires were equipped on the front axle of the float body truck as above described and filled with inner pressure of 8.0 kg/cm$^2$. The truck was driven 120,000 Km on paved highways and general paved roads with the ratio of 80% and 20% under 100% loaded condition. Thereafter, the treads of the tires were inspected. For results, with the Comparative tires A, rib punches having depths of 1.8 mm occurred in the center ribs 29a, on the other hand, river wear having 7.0 mm width and 2.0 mm depth occurred in the side ribs of the Comparative tires B. In contrast herewith, with the Example tires a, c, d and e, irregular wear scarcely occurred. With only the Example tire b, slight heel and toe wear occurred in the side ribs.

In this manner, the irregular wear occurred to a fair extent in the respective Comparative tires. On the other hand, in the Example tires to which the present invention was applied, the irregular wear scarcely occurred to find that the present invention can completely prevent the irregular wear. After truck travel, moreover, the tires were cut to inspect the ends of the belts and find that there were little cracks in of the Example tires. The tires according to the invention could prevent the end separation in the tires.

As can be seen from the above explanation, the present invention can prevent both the belt end separation and the irregular wear in reliable manner.

It is further understood by those skilled in the art that the foregoing description is that of preferred embodiments of the disclosed tires and that various changes and modifications may be made in the invention without departing from the spirit and scope thereof.

What is claimed is:

1. A pneumatic radial tire including a carcass layer consisting of at least one carcass ply having cords embedded therein and extending substantially in radial directions, a thread arranged radially outwardly of the carcass layer, and a belt layer consisting of at least two layers of belt plies having cords embedded therein intersecting with each other at angles within 10°–40°, wherein the tire comprises a reinforcing layer arranged between said carcass layer and the belt ply arranged radially outermost and said reinforcing layer consisting of at most two layers of reinforcing plies having high elongation steel cords embedded therein substantially in parallel with an equatorial plane, each axial outer end of the reinforcing layer is positioned inwardly, from a thread shoulder end a distance of one-fifth of a maximum tread width of the tire in an axial tread direction, and wherein sum of moduli of elasticity in cord directions per unit width of the reinforcing layer is within 10%–35% of sum of moduli of elasticity in cord directions per unit width of the belt plies.

2. A pneumatic radial tire as set forth in claim 1, wherein each axial outer end of at least one reinforcing ply of the reinforcing layer is positioned outwardly, at a location one tenth of the tread width of the tire from the equatorial plane of the tire.

3. A pneumatic radial tire including a carcass layer consisting of at least one carcass ply having cords embedded therein and extending substantially in radial directions, a thread arranged radially outwardly of the carcass layer, a belt layer consisting of at least two layers of belt plies having cords embedded therein intersecting with each other at angles within 10°–40°, and a reinforcing layer arranged between said carcass layer and said thread and said reinforcing layer consisting of at most two layers of reinforcing plies having cords embedded therein intersecting at angles of 0°–10° with respect to an equatorial tire plane, and said tread being formed in an outer circumference with either of four and five main annular grooves substantially in parallel with the equatorial plane to form center ribs at a center portion of the tread width directions and a pair of side ribs on both sides of the center ribs, wherein outer ends of at least one reinforcing ply are positioned inwardly, in the width directions, of outermost ends of the main grooves between the center ribs and the side ribs, and the side ribs are formed with a plurality of traverse grooves spaced apart from each other in circumferential directions and having both ends opening into the main grooves.

4. A pneumatic radial tire as set forth in claim 3, wherein said traverse grooves are sipes.

5. A pneumatic radial tire as set forth in claim 3, wherein said traverse grooves are wide grooves.

* * * * *